(No Model.) 2 Sheets—Sheet 2.
C. F. CHRISTOPHER.
FLY TRAP.
No. 554,654. Patented Feb. 18, 1896.
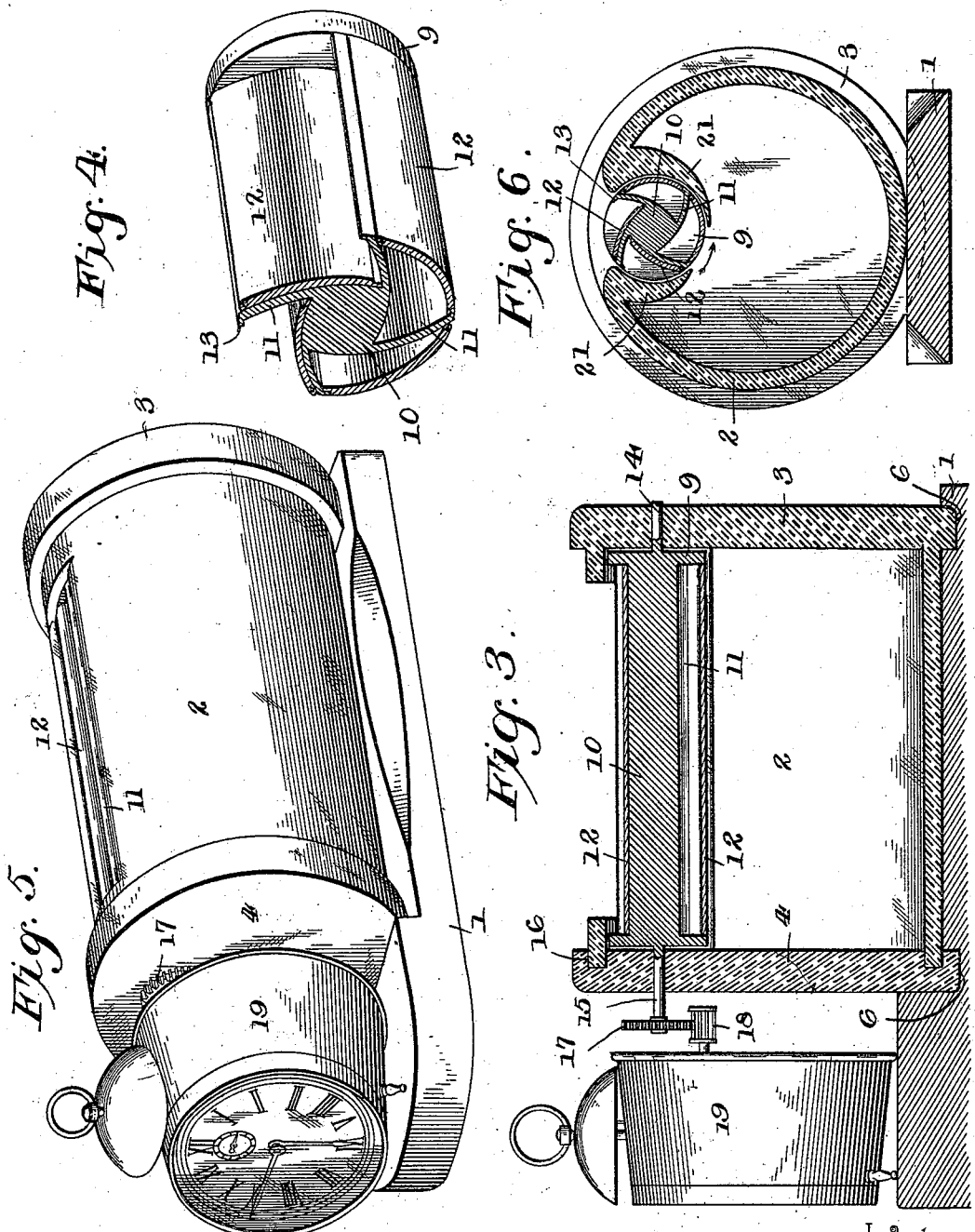
Witnesses
Chas. A. Ford
J. F. Riley
Inventor
Calvin F. Christopher,
By his Attorneys,
C. A. Snow & Co.

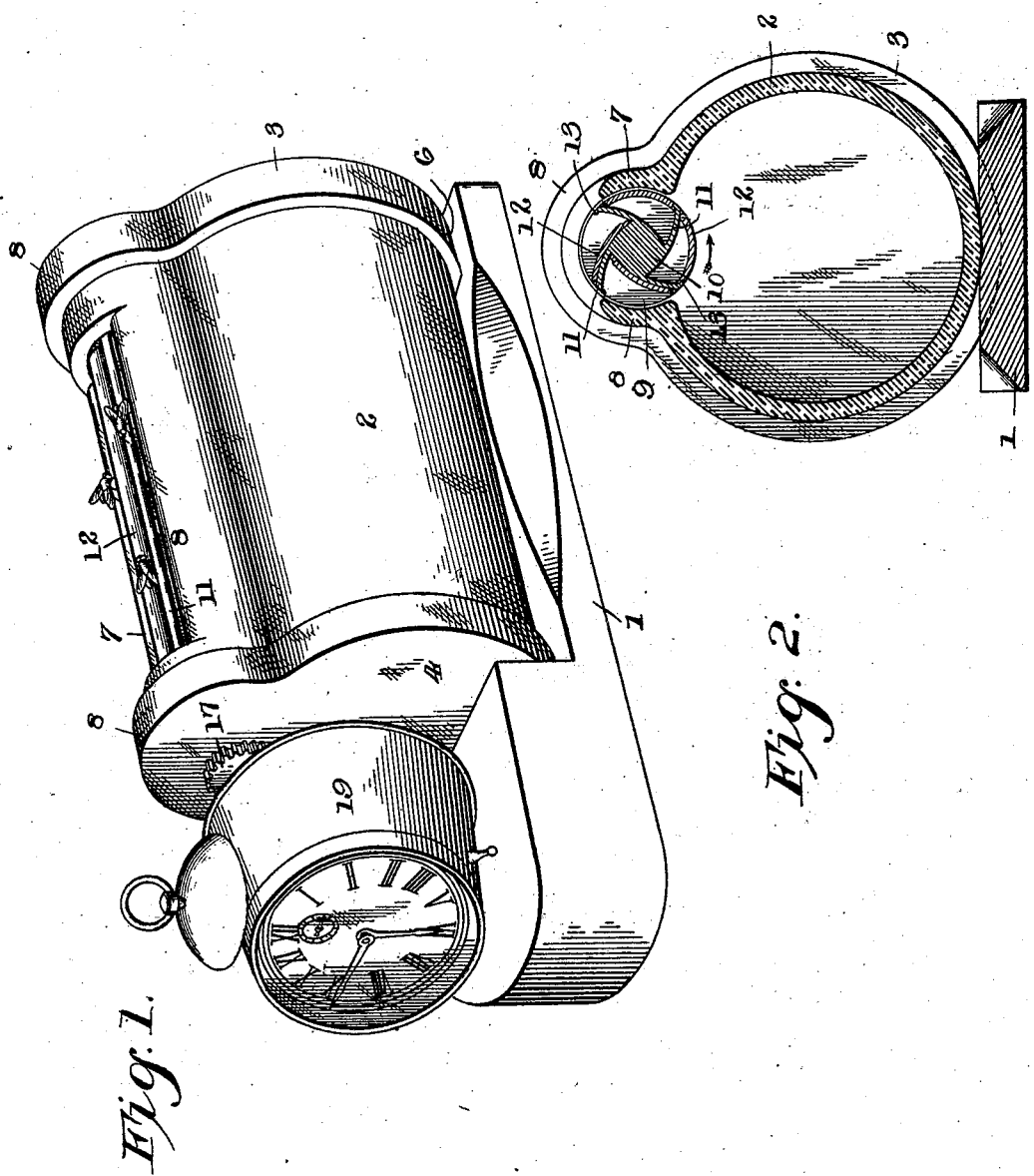

UNITED STATES PATENT OFFICE.

CALVIN F. CHRISTOPHER, OF SPARTANBURG, SOUTH CAROLINA, ASSIGNOR OF ONE-THIRD TO H. E. RAVENEL, OF SAME PLACE.

FLY-TRAP.

SPECIFICATION forming part of Letters Patent No. 554,654, dated February 18, 1896.

Application filed September 21, 1895. Serial No. 563,167. (No model.)

*To all whom it may concern:*

Be it known that I, CALVIN F. CHRISTOPHER, a citizen of the United States, residing at Spartanburg, in the county of Spartanburg and State of South Carolina, have invented a new and useful Fly-Trap, of which the following is a specification.

The invention relates to improvements in fly-traps.

The object of the present invention is to provide a simple, inexpensive and efficient trap which will be capable of rapidly catching and imprisoning flies and adapted to permit the captured flies to be readily destroyed and conveniently removed from it.

The invention consists in the construction and novel combination and arrangement of parts hereinafter fully described, illustrated in the accompanying drawings, and pointed out in the claims hereto appended.

In the drawings, Figure 1 is a perspective view of a fly-trap constructed in accordance with this invention. Fig. 2 is a transverse sectional view. Fig. 3 is a longitudinal sectional view. Fig. 4 is a detail perspective view of a portion of a rotary flanged cylinder. Fig. 5 is a perspective view illustrating a modification of the invention. Fig. 6 is a transverse sectional view of the same.

Like numerals of reference indicate corresponding parts in all the figures of the drawings.

1 designates a base, on which is removably mounted a casing 2, forming a cage and constructed of any suitable material, such as glass, wire-netting, or the like, glass, however, being preferable. The cage 2 is preferably cylindrical, and its ends 3 and 4 project slightly beyond the sides, forming annular flanges, which are received in corresponding grooves 6 of the base, whereby the receptacle or casing is firmly mounted on the base.

The casing or receptacle 2 is provided at its top with a longitudinal opening 7, and has at opposite sides of the opening similar curved flanges 8, which partially embrace a revolving flanged cylinder 9, operating in the opening 7 and adapted to trap the flies and to convey them into the casing. This flanged cylinder is removably journaled in the casing or receptacle 2, and it consists of a central portion or core 10 and outwardly-extending longitudinally-disposed curved flanges 11. The core is substantially rectangular in cross-section, and the flanges extend outward from the corners or angles thereof, and they have arranged on them curved plates 12. The curved plates 12 are hinged at their outer edges to the outer longitudinal edges of the curved flanges, and each flange forms with the adjacent portion of the core a convex face against which the companion plate is adapted to rest when the said plate is at the top of the cylinder.

The plates may be hinged by any suitable means, and as the flanged cylinder rotates in the space between the curved flanges 8 of the casing the hinged plates are operated by gravity, and they swing inward as they arrive at the top of the cylinder and maintain such a position until they reach the bottom, when they swing downward and form a curved cylindrical surface at the bottom of the cylinder, which effectually closes the opening 7 at the interior of the receptacle or casing to prevent the escape of flies. The outward swinging of the hinged plates or doors is limited by stops 13 arranged at the outer edges of the flanges 11 and extending over the free edge of the adjacent plate The outer convex faces of the hinged plates are designed to be provided with a suitable substance or bait to attract the flies, which will alight on the exposed plates 12 in the recess or pocket formed by them and the flange 11 adjacent to their free edges, and as the flanged cylinder is steadily rotated forward in the direction of the arrow the flies will be gradually and imperceptibly carried forward beneath the adjacent flange 8, and thereby confined, and after the flies are carried downward beyond the flange 8 the hinged plate or door swings downward and throws them into the cage or casing. The hinged plate remains swung outward until it passes the lower portion of the opposite flange 8, thereby effectually shutting off the flies and preventing them from following the cylinder in its rotation.

The journal 14 of the flanged cylinder is removably arranged in a bearing-opening of the outer end 3 of the casing, and the other journal 15 is arranged in a bearing-opening of the inner end 4, which is removable and which is provided with an annular groove 16 to receive the adjacent edge of the cylindrical or substantially cylindrical body portion of the casing 2. By removing the inner end 4 the flanged cylinder is also removed, and the contents of the casing may be readily emptied.

The journal 15 is provided with a cog-wheel 17 which meshes with a pinion 18, fixed to the seconds-hand arbor or shaft of a clock 19; but any other desired motor may be employed for rotating the flanged cylinder. The clock is mounted on the base 1, and the parts are arranged in such relation to each other that when the casing 2 is placed in the grooves of the base the gearing will properly mesh.

After a quantity of flies have been caught the casing may be readily removed from the base, and it is preferably submerged in water, which will fill it and destroy the flies. After the flies have been destroyed the inner end of the casing is removed, together with the flanged cylinder, and the water and flies are emptied out of the casing.

In Figs. 5 and 6 of the accompanying drawings is illustrated a modification of the invention. The casing is provided with inwardly-extending flanges 21; but the flanges are preferably arranged as illustrated in the other figures of the drawings. Either form may be employed, and transparent material is preferable, as it does not obstruct the light, and the flies are imperceptibly imprisoned.

It will be seen that the trap is simple and inexpensive in construction, that it is strong and durable, and that it is effective. It will also be apparent that the captured flies may be readily destroyed and conveniently removed from it.

Changes in the form, proportion and minor details of construction may be resorted to without departing from the principle or sacrificing any advantages of the invention.

What I claim is—

1. In a fly-trap, the combination of a cage or casing provided with an opening, a flanged cylinder journaled on the cage or casing and arranged at the opening and forming recesses, hinged plates or doors carried by the flanged cylinder and arranged to swing into the recesses when at the top of the cylinder and to swing downward to close the cage or casing when at the bottom of the cylinder, and means for rotating the cylinder, substantially as described.

2. In a fly-trap, the combination of a cage or casing provided with an opening, and a rotary cylinder journaled on the cage or casing at the opening and provided with outwardly-extending flanges, and plates or doors hinged to the outer edges of the flanges and adapted to close the said opening at the interior of the cage or casing, substantially as described.

3. In a fly-trap, the combination of a cage or casing having a longitudinal opening and provided at opposite sides of the same with curved flanges, a horizontally-disposed flanged cylinder arranged between the said flanges and provided with hinged plates or doors and having means for limiting the outward swing of the said plates or doors, and a motor for rotating the cylinder, substantially as described.

4. In a fly-trap, the combination of a base, a motor arranged on the base and provided with an exteriorly-arranged pinion, a cage or casing detachably mounted on the base and adapted to be removed therefrom for the purpose of destroying flies, and capable of being readily replaced on the base and arranged adjacent to the motor and provided with an opening, a cylinder journaled on the cage or casing and arranged at the opening, and a cog-wheel disposed exteriorly on the casing and connected with the cylinder and arranged to mesh with said pinion when the cage or casing is in position on the base, substantially as described.

In testimony that I claim the foregoing as my own I have hereto affixed my signature in the presence of two witnesses.

C. F. CHRISTOPHER.

Witnesses:
JOHN H. SIGGERS,
G. C. SHOEMAKER.